United States Patent [19]
Saltzman

[11] Patent Number: 6,161,116
[45] Date of Patent: Dec. 12, 2000

[54] IDEOGRAMMATIC CHARACTER EDITOR METHOD AND APPARATUS

[76] Inventor: Lawrence A. Saltzman, 135 Plymouth St., Apt 601, Brooklyn, N.Y. 11201

[21] Appl. No.: 09/089,230

[22] Filed: Jun. 2, 1998

Related U.S. Application Data

[60] Provisional application No. 60/060,689, Sep. 23, 1997.
[51] Int. Cl.[7] .............................. G06F 17/22; G06F 17/28
[52] U.S. Cl. .............................. 707/535; 707/536; 704/8; 345/141; 345/142; 382/185
[58] Field of Search .................................. 707/535, 536; 704/1, 8; 341/28; 345/141, 142; 382/185

[56] References Cited

U.S. PATENT DOCUMENTS

| | | | |
|---|---|---|---|
| 4,379,288 | 4/1983 | Leung et al. | 341/28 |
| 4,428,065 | 1/1984 | Duvall et al. | 707/7 |
| 4,684,926 | 8/1987 | Yong-Min | 341/28 |
| 4,739,318 | 4/1988 | Cohen | 345/142 |
| 4,937,745 | 6/1990 | Carmon | 707/535 |
| 5,331,557 | 7/1994 | Liu | 707/535 |
| 5,586,198 | 12/1996 | Lakritz | 382/185 |

Primary Examiner—Joseph Thomas
Attorney, Agent, or Firm—I. Marc Asperas

[57] ABSTRACT

The present invention provides an ideogrammatic character editor method and apparatus for creating, editing and communicating ideogrammatic characters which are comprised of a series of strokes forming a word in a particular language. A platform displays pre-formed strokes and provides an area on which the pre-formed strokes are positioned. A selector selects and positions the pre-formed strokes on the platform. An encoder encodes each pre-formed stroke selected and positioned by the selector on the platform as a stroke code and a position on the platform. A processor stores the stroke code and the position for each pre-formed stroke encoded by the encoding unit in a stroke loc list. In preferred embodiments, the present invention creates Japanese Kanji, Chinese and Korean characters, but also creates ideogrammatic characters of any language including those presently existing or those yet to be developed. In other preferred embodiments, the present invention directs a computer processor to perform a method of creating, editing and communicating the foregoing-described ideogrammatic characters.

62 Claims, 18 Drawing Sheets

10:angle-lft-lg

11:angle-lft-sm

12:angle-crv-lft-lg

13:angle-crv-lft-sm

14:angle-rt

15:angle-rthook-lg

16:angle-rt-sm

17:horizont-lg

18:horizont-med

19:horizont-sm

20:dble-flk-bar

21:vertic-lg

22:vertic-med

23:vertic-sm

24:vertic-sm-hook

25:rt-crv-sm-hk

26:rt-crv-hk-lg

27:zig-zag

28:rt-sweep

29:anglehook-uprt

30:horiz,fsh-hk

31:horiz-sweeplft

32:rt-sweep-lg

33:rt-sweep-lg

34:rt-sweep-md

35:rt-sweep-sm

36:horiz-sweep-rt-flk

37:sweep-dwn-rt-flk

38:vert-hook

110:angle-lft-lg

111:angle-lft-sm

112:angle-crv-lft-lg

113:angle-crv-lft-sm

116:angle-rt-sm

115:angle-rthook-lg

114:angle-rt

119:horizont-sm

120:dble-flk-bar

118:horizont-med

117:horizont-lg

121:vertic-lg

122:vertic-med

123:vertic-sm

124:vertic-sm-hook

125:rt-crv-sm-hk

126:rt-crv-hk-lg

127:zig-zag

128:rt-sweep

129:anglehook-uprt

130:horiz,fsh-hk

131:horiz-sweeplft

132:rt-crv-flk

133:rt-sweep-lg

134:rt-sweep-md

135:rt-sweep-sm

136:horiz-sweep-rt-flk

FIG. 6EB
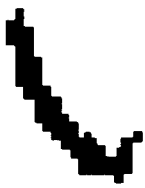
137:sweep-dwn-rt-flk
FIG. 6FB
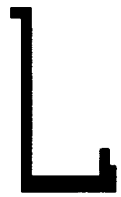
138:vert-hook
FIG. 8
STROKE LOC LIST
[21, 115, 121, 18, 118, 114, 19,
114, 106, 21, 179, 117, 18, 178,
118, 35, 176, 101]

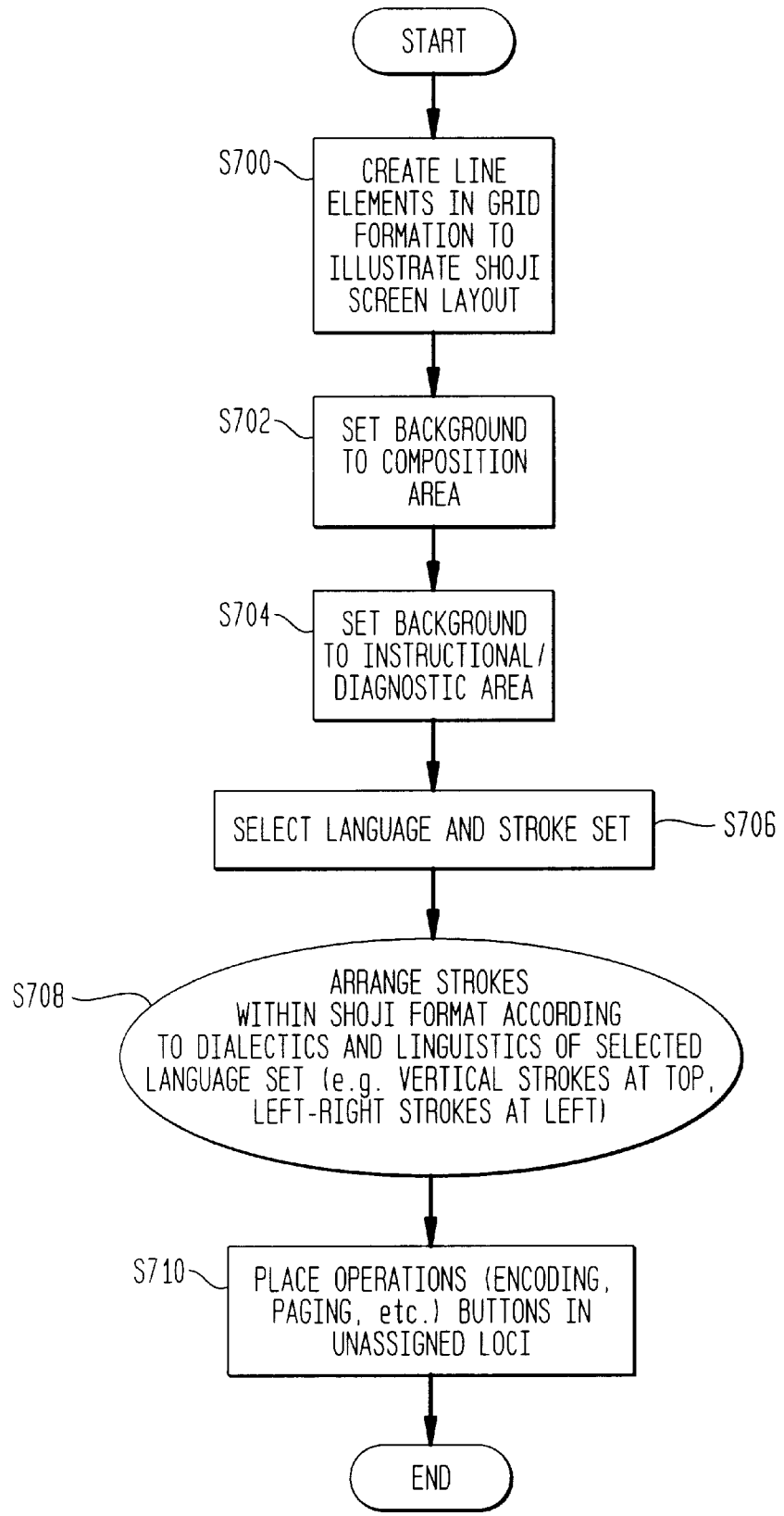

IDEOGRAMMATIC CHARACTER EDITOR METHOD AND APPARATUS

PRIORITY OF INVENTION

This application claims priority from U.S. Provisional Appln. No. 60/060,689 filed Sep. 23, 1997, hereby incorporated by reference

BACKGROUND OF THE INVENTION

1. Field of the Invention

The present invention relates to an ideogrammatic character editor method and apparatus and, more particularly, to creating, editing and communicating ideogrammatic characters.

2. Description of the Related Art

An ideogrammatic character is a symbolic representation of a word. Each Japanese Kanji character as shown in FIG. 1, for example, is an ideogrammatic character comprised of a freestyle arrangement of strokes arranged to express a unique meaning. The form and orientation of the strokes must be accurate because the meaning of each character can change dramatically from "DO" as in the Chinese character of FIG. 2A to "THOUSAND" as in the character of FIG. 2B with the change of a seemingly insignificant stroke 200. Further, the position of the Kanji characters in relation to each other is extremely important and, in the case of the Japanese Haiku of FIG. 3A, the distancing of characters imparts a sense of time passing. In fact, entirely different words can be created by placing characters together. Ideogrammatic characters and their variations, therefore, provide the author with the creativity to represent a potentially infinite range of expression.

Heretofore, there has been no practical ideogrammatic editor which provides the author with the creativity to readily read/write, edit and publish ideogrammatic characters locally or over networks such as the internet. It is impossible as a practical matter to accurately create ideogrammatic characters because the detail required, the potential limitless types of strokes, and the variations of the characters would require an astronomical amount of RAM. Currently, editing ideogrammatic characters requires an impractical exercise of painstaking hours of manipulating individual pixels. Communicating ideogrammatic characters is impractical because ideogrammatic characters are typically 16-bit character fonts which only can be created/received by specially-configured processors.

Microsoft Word™, for example, provides 16-bit characters in a Chinese font which replace the ASCII characters on a computer keyboard. However, the number of "font-based" characters provided is finite and there is no means to easily create new ideogrammatic characters. The number of font-based characters is limited not only by RAM, but also by the limited number of keys on the computer keyboard because each font-based character is assigned to a different keystroke. It has been a common complaint that font-based character sets do not provide enough characters, forcing authors to manually sign their names or choose characters which do not convey what is really meant.

Further, 16-bit font-based characters do not provide the detail necessary to accurately represent ideogrammatic characters. The Kanji shown in FIG. 1 is scripted in traditional calligraphy which imparts each stroke with a brushed effect. The bit-limited font-based characters have proven far too primitive to capture this kind of detail.

Another shortcoming of the 16-bit font-based character set is that only processors specially configured for 16-bit characters can handle them. Typically, IBM PCs handle 8-bit characters while Applies handle 8-bit characters. Thus, the author who desires to write in 16-bit Kanji, for example, must close all applications, crash the computer and reboot in the 16-bit configuration. This is not only extremely aggravating for the user, it is virtually impossible to write Kanji within other applications for the purpose of, for example, uploading E-Mail since the 16-bit character editor must be accessed separately from the Internet application.

Another problem is that conventional font-based applications generate the font-based ideograms from phonetically-spelled words typed in by the user. Since, for example, there are more than a 100 dialects of Chinese, the conventional applications limit those who speak the less spoken dialects to use a computer. Moreover, such phonetic applications require the user to known romaji characters, i.e., the English alphabet, which most Chinese do not.

Font-based character sets do not allow the user to easily edit the characters. There is no means to easily correct or alter the expression of the ideogrammatic character by altering or repositioning the strokes because the font-based characters are fixed blocks of pixels. Futhermore, the position of each font-based character must conform to a block position on the display according to, for example, a rectilinear typeset with rigid columns of 80 characters wide and 240 rows per page. Since different feelings are represented by the relative position of the characters, such as illustrated by the example of the Japanese Haiku shown in FIG. 3A, and since entirely new words are created by placing words together, as illustrated by the example shown in FIGS. 4A–4C, font-based character sets cannot convey the full range of available expression.

It is impractical to download 16-bit characters because the remote computer must be specially configured to receive 16-bit characters. Thus, the remote computer must be crashed and rebooted in the 16-bit configuration. Otherwise, the remote computer will parse the received 16-bit characters into 8-bit ASCII characters, depending upon the PC, and the remote computer will generate incomprehensible ASCII.

Font-based schemes have proven to be impractical for Internet applications for other reasons. It is practically impossible, for example, to post an interactive home page on the Internet using beautifully scripted ideogrammatic characters. 16-bit font-based characters do not provide the detail necessary to accurately represent ideogrammatic characters. Using higher bit configurations may offer higher detail but at the expense of unacceptably large amounts of RAM.

Scanning the ideogrammatic characters into the home page increases bandwidth as well as access time and is not interactive, i.e. cannot be selected as an option or as hypertext by the user. In addition, scanned images are not easily copied or edited by the user and, for that matter, yield poor prints as compared to characters which are printed from printer codes.

Font-based character computers are costly because they must be specially-equipped with a processor which can handle the 16-bit characters and a keyboard labeled with the characters they represent. To add to this cost, these specially-equipped computers are not widespread in the United States and must often be purchased at a premium from overseas distributors.

OBJECTS AND SUMMARY OF THE INVENTION

An object of the invention, therefore, is to provide an author with the means/steps for readily creating ideogrammatic characters;

Another object of the invention is to provide the author with the means/steps for creating ideogrammatic characters with detail;

Still another object of the invention is to provide the author with the means/steps for creating ideogrammatic characters using any type of stroke and orientation;

Yet another object of the invention is to provide the author with the means/steps for creating ideogrammatic characters with a full range of expression;

While another object of the invention is to provide the author with the means/steps for creating ideogrammatic characters at any position relative to each other;

Thus another object of the invention is to provide the author with the means/steps for creating ideogrammatic characters without reconfiguring the microprocessor;

A further object of the invention is to provide the author with the means/steps for editing ideogrammatic characters;

A still further object of the invention is to provide the author with the means/steps for editing ideogrammatic characters without manipulating individual pixels;

While a further object of the invention is to provide the author with the means/steps for editing the form and orientation of the strokes comprising the ideogrammatic characters;

Thus a further object of the invention is to provide the author with the means/steps for editing the position of the ideogrammatic characters;

An additional object of the invention is to provide the author with the means/steps for uploading/downloading ideogrammatic characters;

Still an additional object of the invention is to upload ideogrammatic characters over the Internet without reconfiguring the remote computer; and Yet an additional object of the invention is to provide a cost effective ideogrammatic editor.

In accordance with this invention, an ideogrammatic character editor apparatus is provided for creating an ideogrammatic character which is comprised of a series of strokes representing a word of a language. Platform means displays pre-formed strokes and provides a platform on which the pre-formed strokes are positioned. Selecting means selects and positions said pre-formed strokes displayed by the platform means on the platform. Encoding means encodes each pre-formed stroke selected and positioned by the selecting means on the platform as a stroke code and a position on the platform. Processing means stores the stroke code and the position for each pre-formed stroke encoded by the encoding means in a stroke loc list.

In preferred embodiments, the present invention creates Japanese Kanji, Chinese and Korean characters, but also creates ideogrammatic characters of any language including those presently existing or those yet to be developed. In other preferred embodiments, the present invention directs a computer processor to perform a method of creating, editing and communicating the foregoing-described ideogrammatic characters.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a flow chart for displaying the editor of the present invention;

FIG. 8 is an example of the stroke loc list of the present invention;

DETAILED DESCRIPTION OF THE PREFERRED EMBODIMENTS

The editor of the present invention is best thought of as a platform through which the author's creativity is unbounded. With this platform, the author readily creates ideogrammatic characters to communicate any expression. To further enable expression, the platform of the present invention is set in an environment suitable to the linguistics of the author. In other words, the platform's features are particularly suited to the author's language such that these features actually function to assist in the creation of the ideogrammatic characters.

Figure 5:
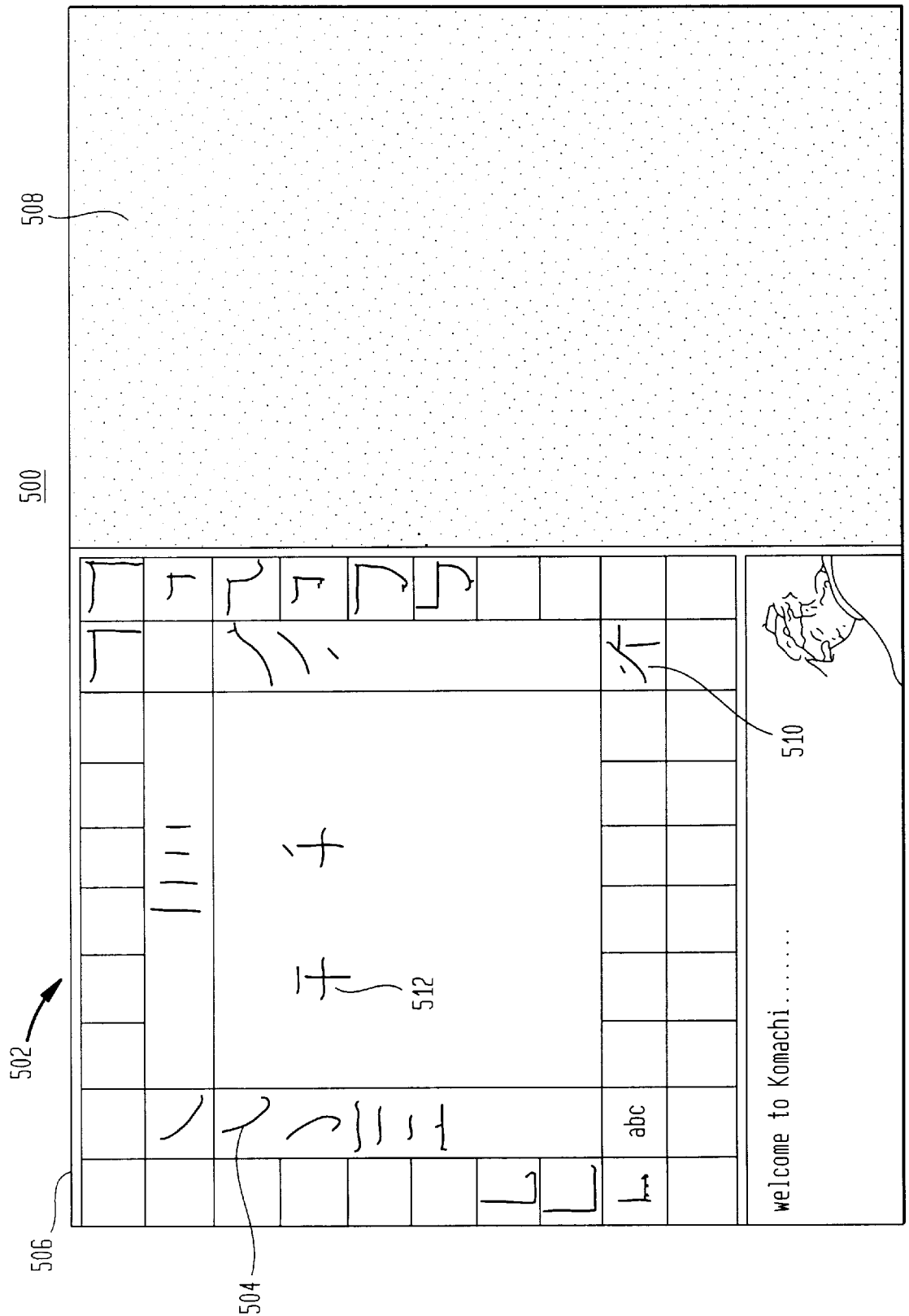
FIG. 5 illustrates the editor according to an embodiment of the present invention.
Figure 6A:
FIGS. 6A to 6FB illustrates the pre-formed strokes displayed in the embodiment of FIG. 5 of the present invention.
Figure 6B:
Figure 6C:
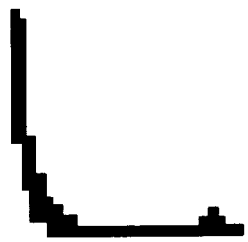
Figure 6D:
Figure 6E:
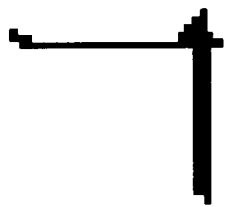
Figure 6F:
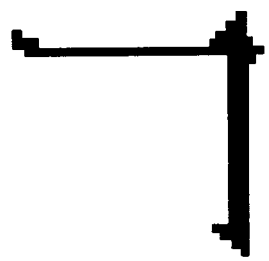
Figure 6G:
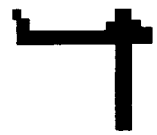
Figure 6H:
Figure 6I:
Figure 6J:
Figure 6K:
Figure 6L:
Figure 6M:
Figure 6N:
Figure 6O:
Figure 6P:
Figure 6Q:
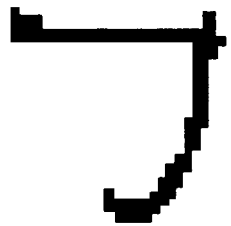
Figure 6R:
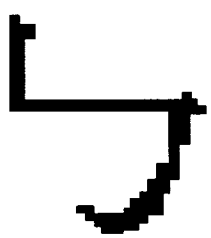
Figure 6S:
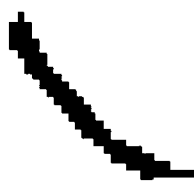
Figure 6T:
Figure 6U:
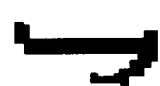
Figure 6V:
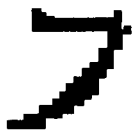
Figure 6W:
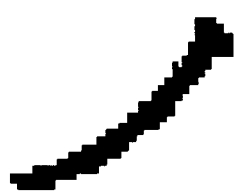
Figure 6X:
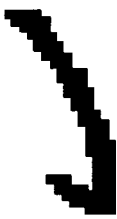
Figure 6Y:
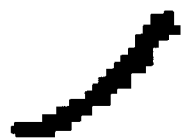
Figure 6Z:
Figure 6A:
Figure 6B:
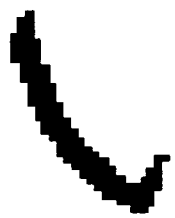
Figure 6C:
Figure 6D:
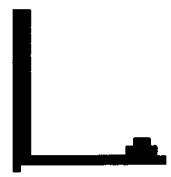
Figure 6E:
Figure 6F:
Figure 6G:
Figure 6H:
Figure 6I:
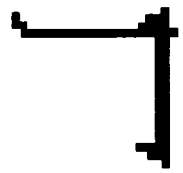
Figure 6J:
Figure 6K:
Figure 6L:
Figure 6M:
Figure 6N:
Figure 6O:
Figure 6P:
Figure 6Q:
Figure 6R:
Figure 6S:
Figure 6T:
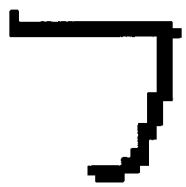
Figure 6U:
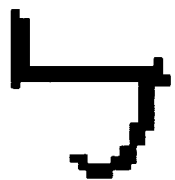
Figure 6V:
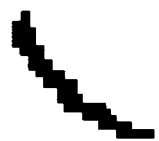
Figure 6W:
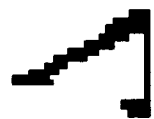
Figure 6X:
Figure 6Y:
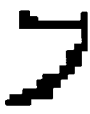
Figure 6Z:
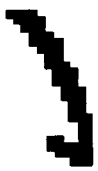
Figure 6A:
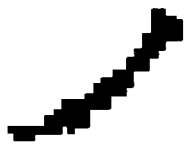
Figure 6B:
Figure 6C:
Figure 6D:
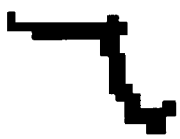

FIG. 5, for example, shows an embodiment of the editor 500 of the present invention particularly suited for creating Japanese Kanji. The editor 500 includes a platform 502 surrounded Kanji strokes 504 set in an attractive Japanese shoji (rice-paper door) format 506. The platform 502 is styled after a traditional Japanese room, or "dojo", which has a central square as its focus. Preferably, the platform 502 includes an optional design 508, such as the traditional Japanese "rice paper", drawn next to the platform. The Kanji strokes 504, the "accoutrements" of the dojo, are set in an orderly Japanese fashion in the shoji along each side of the platform.

It will be appreciated that the platform design has function. The dojo design of the platform, a central square, functions to focus the author's creativity. This is extremely important to the Japanese who are accustomed to interfacing with the dojo because the dojo/platform places the author into a creative mind set.

Another aspect of the dojo is that its "accoutrements" are orderly arranged along each side to provide easy access and to make efficient use of the surrounding space. Consistent with this, the strokes 504 are arranged on all four sides of the platform 502, thereby functionally making full use of the space around the platform and increasing the number of strokes available. In addition, each stroke is set in an orderly manner within each "pane" of the shoji, assisting the author's task of locating the desired stroke. The strokes are placed in the shoji panes according to their type to further assist in locating the strokes.

Figure 1:
FIG. 1 is illustrates Japanese Kanji in a traditional rectangular scroll.
Figure 2B:
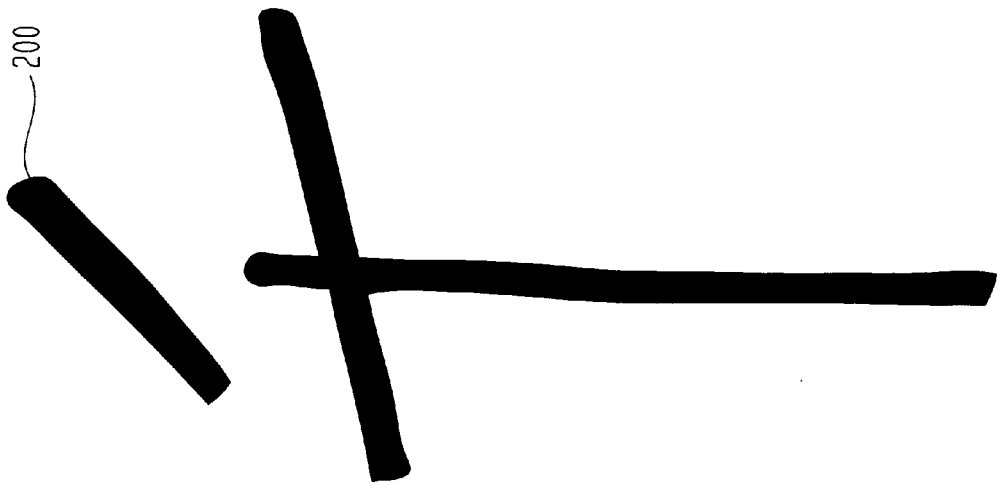
FIGS. 2A and 2B illustrates Chinese characters which appear similar but are very different in meaning.
Figure 2A:
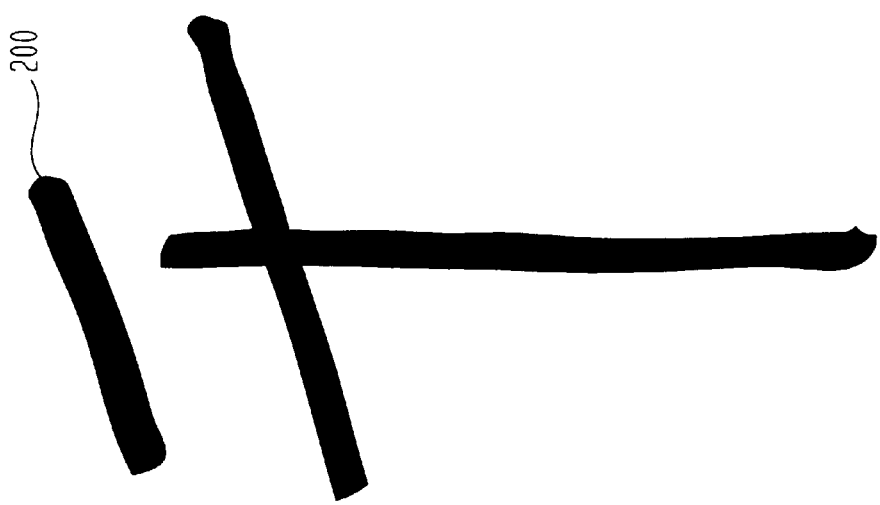
Figure 3A:
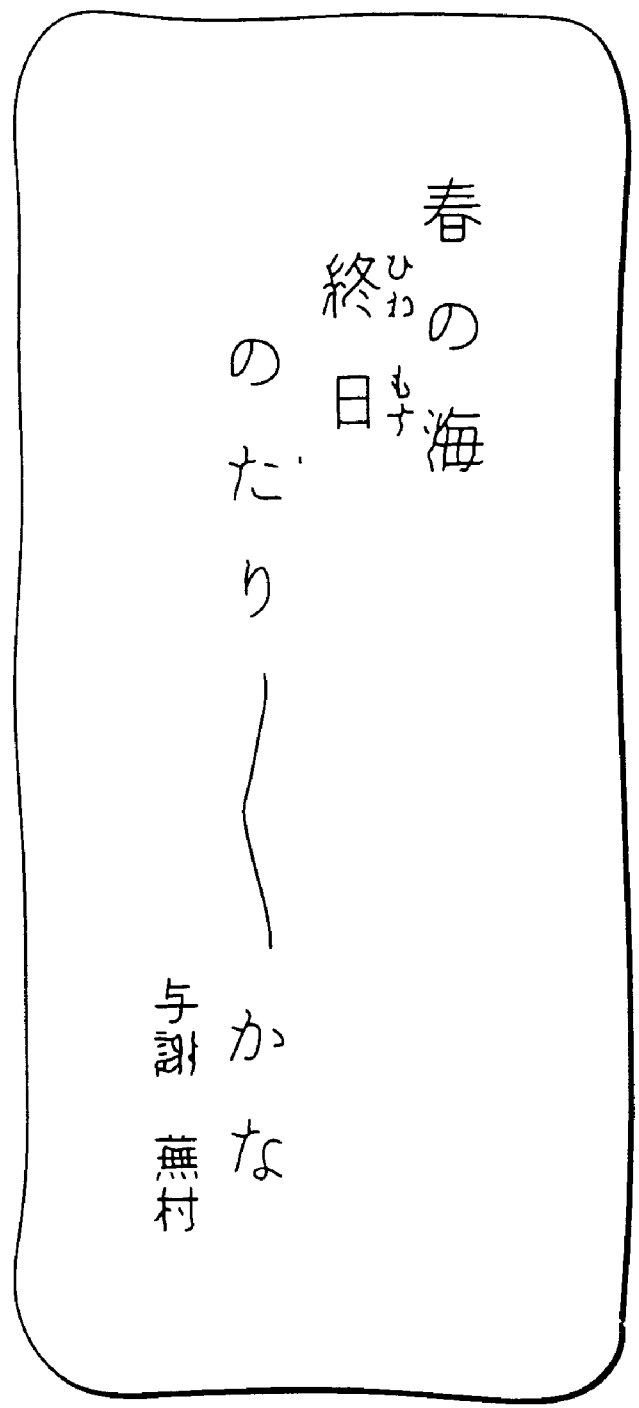
FIGS. 3A and 3B illustrates Japanese Haiku.
Figure 3B:
Figure 4A:
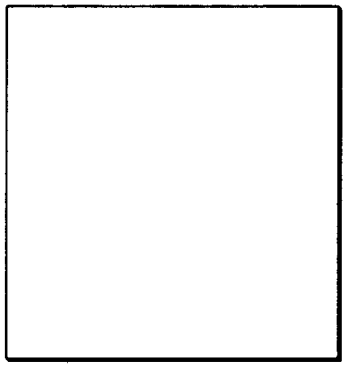
FIGS. 4A–C illustrates Ideograms.
Figure 4B:
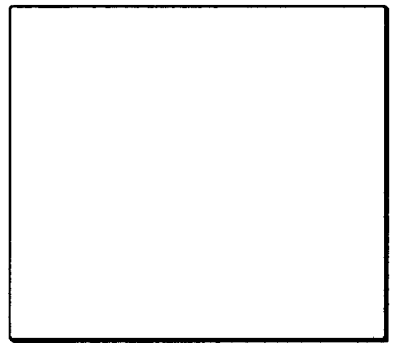
Figure 4C:
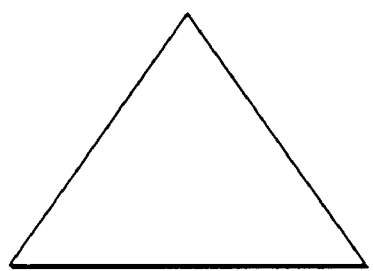

The optional design 508 drawn on the platform may be selected by the author to serve as both an inspiration to the author and to convey meaning to the author's work. In Japanese, it is not uncommon to implement illustrations in writing which are not only decorative, but convey meaning to the writing. This is typical in Haiku where an illustration of a "duck" is provided in FIG. 3B. Thus, the optional design 508 functions to both inspire the author's creativity and convey meaning to the author's work.

The editor of the present invention provides user-controlled operations such as encoding and paging. In FIG. 5, for example, a "Kanjify" button 510 is provided which the user "clicks on" to encode the formed characters 512. The encoded characters are assembled by the editor on the rice-paper 508 and the encoded characters are communicated as a page to a remote computer.

The features of the editor 500 shown in FIG. 5 will now be explained with more particularity. The platform 502 is in the shape of a dojo, but it will be appreciated that the platform may be of any shape. Preferably, the shape of the platform should assist the expression of the author. For example, the platform may be in the shape of a rectangular hanging-scroll which has an Asian quality or in the shape of a hoop which reminds one of American Indian or Hebrew.

The platform 502 allows the author to selectively position ideogrammatic characters relative to each other. In other words, the editor of the present invention does not limit the author to positioning the ideogrammatic characters to conventional, rectilinear type-set positions arranged in ordered columns and rows. This has at least a three-fold advantage. First, the editor of the present invention allows the author to change the meaning of the ideogrammatic characters or the sentences by changing the relative position of the characters as in the case of the Haiku shown in FIG. 3A. Second, selectively positioning the ideogrammatic characters relative to each other allows the author to write in any style, including western (horizontal, left-to-right), eastern (vertical, right-to-left), and non-traditional (diagonal, fractal, for example). Third, the editor of the present invention allows the author to overlap the strokes.

The positions of the ideogrammatic characters on the platform may correspond to continuous pixel positions of a computer monitor. The position of the ideogrammatic characters may also correspond to a grind. Unlike the rectilinear type-set positions of the conventional art, strokes in the present invention may overlap and share the same grid. Such a grid may include a "snap-to-grid" option whereby the author's strokes "snap" to pre-defined positions. This allows the author to precisely align the strokes, thereby aiding the author in forming ideogrammatic characters accurately.

Returning to FIG. 5, the particular strokes 504 are pen or brush-style strokes. Preferably, each stroke is a pre-formed group or pixels representing a stroke in a particular language. In FIG. 5, for example, the strokes 504 correspond to strokes in Japanese Kanji. The pixel diagrams for the set of Kanji strokes developed for FIG. 5 is shown in FIGS. 6A–6EB. It will be appreciated, however, that the set of Kanji strokes shown is not limited to the set shown in the figures. For example, the Kanji strokes might be modified to have a brush effect. Of course, the strokes will differ for different languages. In addition, the ideogrammtic character editor of the present invention edits radical elements which comprise one or more strokes.

The strokes 504 in FIGS. 6A–6EB are arranged in a shoji, rice-paper door, format to both organize the strokes and provide an attractive format. Of course, the arrangement of the strokes is not set and may vary depending on the particular author. In the embodiment of FIG. 5, the strokes are preferably arranged in the shoji according to their type. Vertically-aligned strokes, for example, are arranged along the top and bottom of the platform 502, while horizontally-aligned strokes are arranged along the left and right sides of the platform 502. Similarly, diagonally-aligned strokes are arranged orthogonally to the platform. Arranging the strokes in this manner assists the author in quickly locating the strokes.

In addition, the strokes 504 in FIG. 5 are preferably arranged in the shoji according to the direction in which the stroke is drawn. For example, strokes drawn from left to right are arranged in FIG. 5 along the left side of the platform 502. Strokes drawn from right to left are arranged along the right side of the platform, etc. This not only further assists the author in locating the strokes, it assists the author in creating the character. This eliminates the mental process of preassembling the entire ideogram in the author's mind while also providing the author with the tactile sense of the traditional brushing of strokes.

In operation, the author accesses the editor application of the present invention and the editor appears on the monitor. More particularly, and with reference to FIG. 7, the editor of the present invention creates line elements in a grid formation to illustrate the screen layout. In FIG. 5, for example, the shoji platform is displayed.

In step S702, the editor sets the background to the composition area and, in step S704, sets the background to the instructional/diagnostic area. It will be appreciated that the backgrounds are predetermined to assist the creativity of the author. In FIG. 5, for example, the background may be the rice-paper 508.

In step S706, the editor selects the language and stroke set. In FIG. 5, the language is Japanese and the stroke set is Kanji. Other languages, such as Chinese and Korean, are also selectable.

Next, the editor arranges the strokes according to the dialectics and linguistics of the selected language set. As explained, the vertical strokes are positioned at the top and left-right strokes are positioned at the left in FIG. 5.

In step S710, the editor places operation "buttons" in unassigned lock (shoji-panes) such as the "Kanjify" button 510 shown in FIG. 5. Other operation buttons may include encrypting and paging. Thus, the editor of the present invention is accessed and editing according to FIG. 8 may commence.

The author then creates an ideogrammatic character by selecting, by use of a mouse for example, each stroke and positioning the strokes on the platform in a unique arrangement. As shown in FIG. 5, replicas of each stroke are selected from the shoji and "dragged" on the platform 502. Then, the editor of the present invention stores a stroke code for each type of stroke and its position in the stroke location list, hereinafter "stoke loc list", shown in FIG. 8. If the user makes a mistake, a stroke already placed on the platform may be moved by clicking and dragging that stroke and the stroke loc list is updated. In this manner, the author readily creates ideogrammatic characters with the editor of the present invention on the platform to form a page of literary expression. The stroke loc list is then communicated via internet or other connection.

It will be appreciated that the stroke loc list of the present invention saves local memory because a stroke code and a position require much less space then a group of pixels. In addition, the stroke codes and positions make the editing of each stroke easier since each stroke is edited by manipulating its code or position rather than pixels. Further, uploading/downloading the stroke loc list is far faster than uploading/downloading characters because stroke codes and positions require far less bandwidth than 16-bit characters. For that matter, the users do not need to "crash" their computers to upload/download ideogrammatic characters in the present invention.

Figure 9:
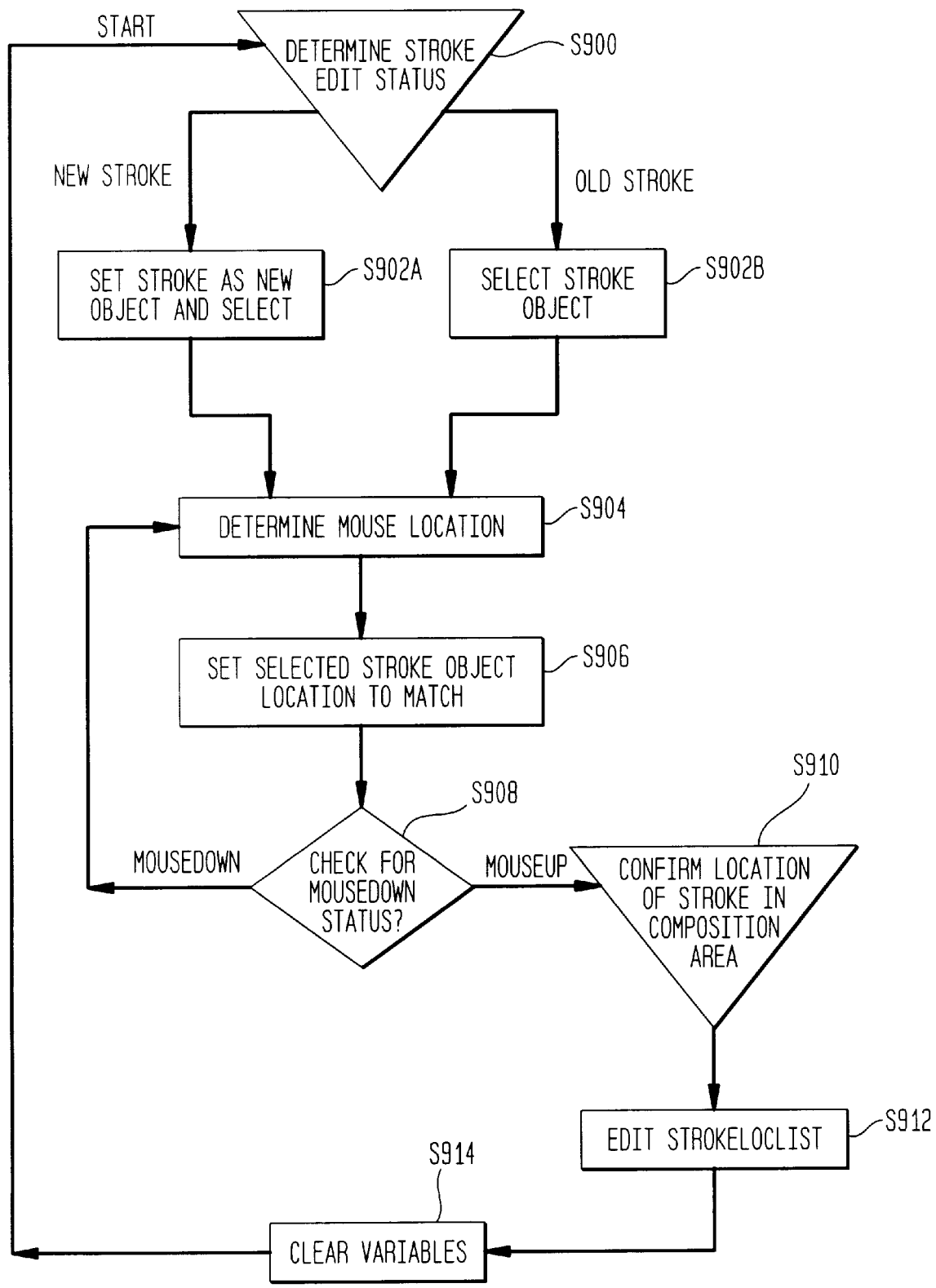
FIG. 9 is a flow chart for selecting and positioning the strokes of the present invention.

In a preferred embodiment, and with reference to the flow chart of FIG. 9, mouse clicking and dragging starts and the editor initially determines the stroke edit status in step S900. If the stroke is a new stroke, control advances to step S902A where the editor of the present invention sets the stroke as a new stroke object and selects the same. If an old stroke which is already placed on the platform is clicked-on, control advances to step S902B, wherein the editor selects the stroke object.

Then, in step S904, the location of the mouse is determined and, in step S906, the editor sets the selected stroke object to match. Control advances to step S908 wherein the editor checks the status of the mouse and redirects control back to step S904 when the mouse is in the "mousedown" position. Otherwise, the mouse is in the "mouseup" position and control is advanced to step S910 wherein the editor confirms that the location of the selected stroke is in the composition area and the editor edits the stroke loc list (FIG. 8) as directed by step S912 to thereby set the position of the stroke on the platform. The variables are cleared in step S914 and control returns to step S900.

It will be appreciated that the stroke loc list may be any recorded representation of the data such as, but not limited to, a table, a data base, a spreadsheet, bit streams, etc.

Figure 10A:
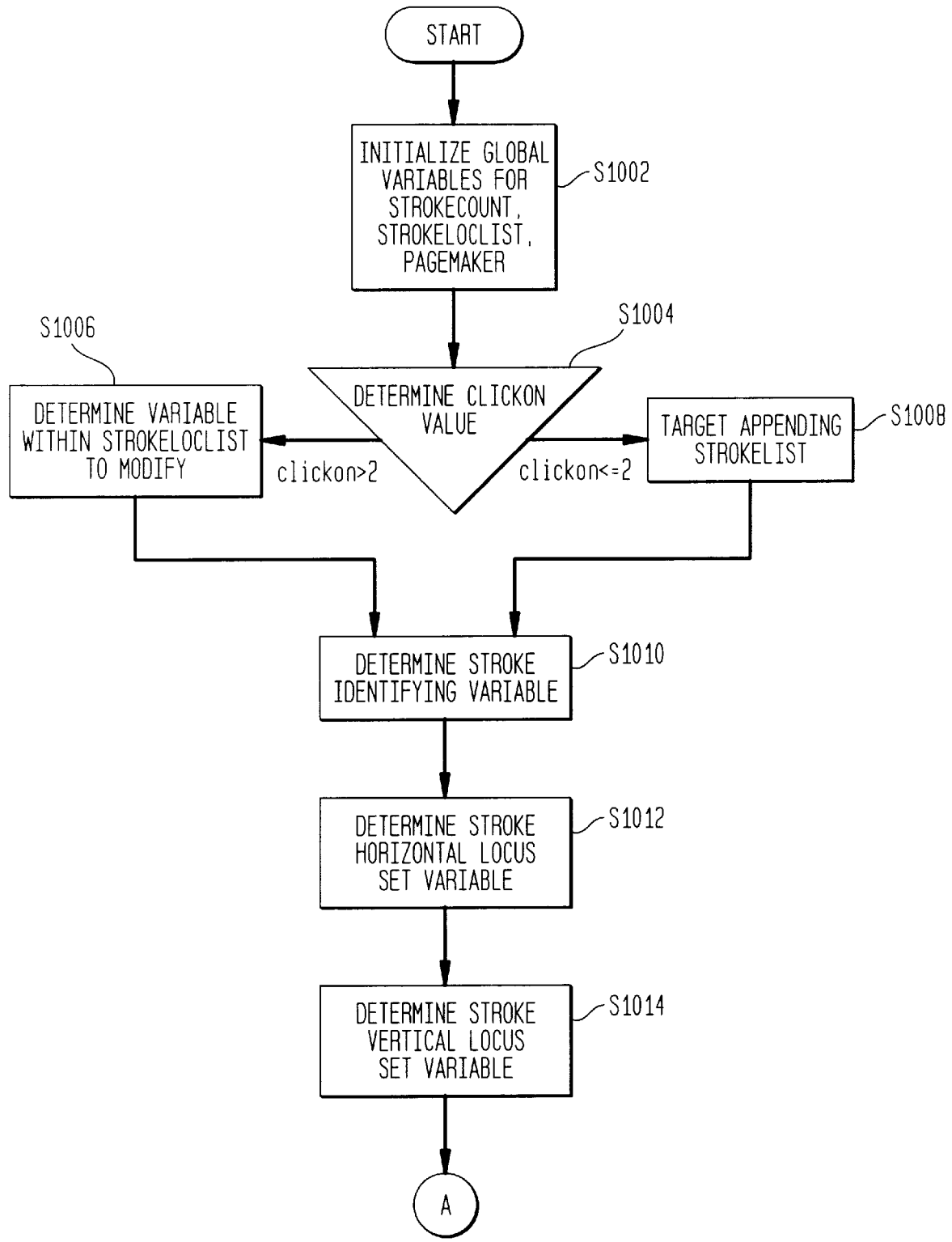
FIGS. 10A and 10B is a flow chart for editing the stroke loc list of the present invention.
Figure 10B:
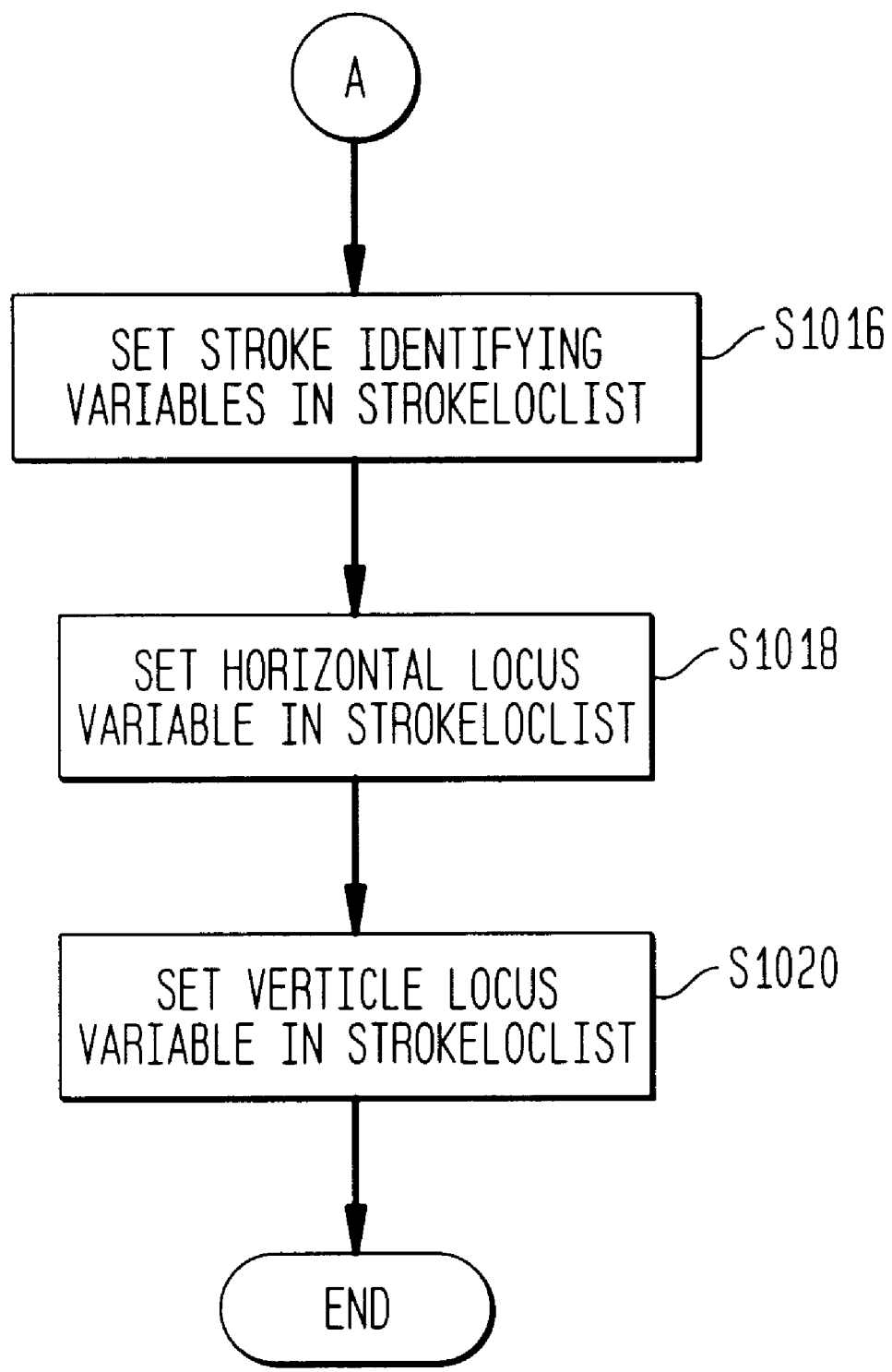

The editor of the preferred embodiment selects and positions strokes in this manner as directed by the user. The preferred manner in which the stroke loc list is edited will now be described with reference to the flow chart of FIGS. 10A and 10B. Wherein the global variables for strokecount, strokeloclist and pagemarker are initialized in step S1002. In step S1004, the editor determines the clickon value which is the value corresponding to the type of stroke. If the clickon value is >2 then, in the preferred embodiment, the stroke is already positioned on the platform and its location is determined within the stroke loc list as directed by step S1006. Otherwise, it is determined in step S1008 that the stroke is new or "appending".

In either case, control advances to steps S1010, S1012 and S1014 wherein the editor determines the stroke identifying variable, horizontal locus set variable and determine stroke vertical locus set variable. Then, the stroke identifying variable, horizontal locus variable and the vertical locus variable are set in the stroke loc list in steps S1016, 1018 and 1020 and editing ends.

In addition to the embodiments described above, the present invention may be practiced as software code. Preferably, the software code is written using the scripting language "Lingo" and compiled using the Director 5.0™ compiler, but it will be appreciated that the software code can be written in any suitable programming language. It will be appreciated that the software code of the present invention is written using a compiler and the compiled software, therefore, is complete work unto itself, i.e. a stand alone application which is executable and does not require applications to run in the foreground.

The author accesses the editor application and editor 500 shown in FIG. 5 is drawn on the screen. Thus, the platform 502 is assembled and the strokes 504 are arranged in the shoji panes. The author "clicks on" a stroke, represented by a stroke code, using the mouse and "drags" a replica of the selected stroke to a desired position on the screen using the software code shown in Exhibit A. The author depresses the mouse button and "drops" the selected stroke at a position on the platform and the editor stores the stroke code and the position of the stroke on the platform in the stroke loc list according to the software code in Exhibit B. Strokes already placed on the platform are edited by the foregoing procedure using the software code in Exhibits A and B including moving, deleting, rotating or sizing the selected stroke(s). The author assembles strokes in this manner to create an ideogrammatic character. Exhibit C shows the editor of the present invention.

Thus it will be appreciated that the present invention provides a novel ideogrammatic character editor method and apparatus which creates, edits and documents for communication any ideogrammatic character thereby freeing the author's artistic expression to an unlimited range of characters. With this invention, the author edits ideogrammatic characters, positions them in any arrangement on the platform and superimposes them on illustrations. According to the present invention, the stroke loc list has an extremely low bandwidth when compared to the 16-bit font-type characters and, therefore, is far faster to transmit, is editable on the internet and does not require users to crash their computers to create or receive them.

In addition to providing strokes, the present invention, in another embodiment also provides romaji, katakana, hiragana and other characters in the shoji selectable by the user and positioned on the platform. It will be appreciated that, with this embodiment, the user may "label" ideogrammatic characters with english labels which is particularly useful as, for example, a teaching aide to teach people to read ideograms.

Although preferred embodiments of the present invention and modifications thereof have been described in detail herein, it is to be understood that this invention is not limited to those precise embodiments and modifications, and that other modifications and variations may be affected by one skilled in the art without departing from the spirit and scope of the invention as defined by the appended claims.

I claim:

1. An ideogrammatic character editing method for directing a computer to create an ideogrammatic character which is comprised of a series of radical elements representing a word of a language for reproduction substantially as created by an author of said ideogrammatic character, comprising the steps of:

representing pre-formed radical elements on a computer display and for providing a platform on said computer display on which said pre-formed strokes are positioned on said platform by said editor;

selecting and positioning by said author particular pre-formed radical elements displayed on said platform to thereby create said ideogrammatic character;

encoding each pre-formed radical element represented on said platform by said platform selected and positioned on said platform as a stroke code and a position on said platform; and storing the stroke codes and the positions representing the ideogrammatic character as displayed by said platform and as positioned with respect to each other on said platform by said author such that a data size of the data representing the ideogrammatic character as stored is significantly reduced; wherein said ideogrammatic character is reproducible from said storing means as substantially created by said author such that a matching system by which said ideogrammatic character formed by said author is matched to a database of ideogrammatic characters is not employed thereby reducing a time for encoding and storing said ideogrammatic character.

2. The method of claim 1, further comprising the step of storing said stroke code and said position for each preformed radical element encoded as a stroke code and a position in a stroke loc list in memory.

3. The method of claim 1, wherein said step of selecting positions said pre-formed strokes selected thereby at any relative position to other pre-formed strokes positioned on the platform; wherein said storing step stores for reproduction said stroke codes and positions substantially as said particular pre-formed strokes selected and positioned by said author.

4. The method of claim 3, further comprising the steps of:
    selecting and repositioning said pre-formed radical element already positioned on said platform; and
    updating said stroke code and said position in said memory.

5. The method of claim 4, wherein said step of selecting comprises selecting said pre-formed radical element using a computer mouse and dragging the clicked on stroke to a position on said platform.

6. The method of claim 5, wherein said step of displaying further comprises the step of selecting a background selectable by said author representing various designs of the author's culture for inspiring creativity in the author which is superimposed on said platform.

7. The method of claim 4, wherein said step of displaying displays Kanji strokes which, when combined by said author, form Japanese Kanji characters as the pre-formed radical elements.

8. The method apparatus of claim 1, wherein said author in said step of selecting selects positions said pre-formed radical element selected at a nearest position to a grid.

9. The method apparatus of claim 1, wherein said step of displaying displays Chinese strokes which, when combined by said author, form Chinese characters from the particular pre-formed radial elements.

10. The method of claim 1, wherein said step of displaying displays Korean strokes which, when combined by said author, for Korean characters from the particular preformed radical elements.

11. An ideogrammatic character editing method for directing a computer to create an ideogrammatic character which is comprised of a series of strokes representing a word of a language for reproduction substantially as created by an author of said ideogrammatic character, comprising the steps of:
    displaying pre-formed strokes on a computer display and for providing a platform on said computer display on which said pre-formed strokes are positioned;
    selecting and positioning by said author particular said pre-formed strokes displayed on said platform to thereby create said ideogrammatic character;
    encoding each pre-formed stroke selected and positioned on said platform as a stroke code and a position on said platform such that the stroke codes and the positions represent the particular pre-formed strokes as displayed and as positioned with respect to each other on said platform by said author; and
    storing said stroke code and said position for each pre-formed stroke encoded as a stroke code and a position in a stroke loc list in memory such that said ideogrammatic character is reproducible from said memory substantially as said particular pre-formed strokes as displayed by said platform and as positioned with respect to each other by said author; wherein said ideogrammatic character is reproducible from said memory as substantially created by said author such that a matching system by which said ideogrammatic character formed by said author is matched to a database of ideogrammatic characters is not employed thereby reducing a time for encoding and storing said ideogrammatic character.

12. The method of claim 11, wherein said step of selecting positions said pre-formed strokes selected by said author thereby at any relative position to other pre-formed strokes positioned on the platform.

13. The method of claim 12, further comprising the steps of:
    selecting and repositioning said pre-formed stroke already positioned on said platform; and
    updating said stroke code and said position in said memory.

14. The method of claim 13, wherein said step of selecting comprises said pre-formed stroke using a computer mouse and dragging the clicked on stroke to a position on said platform.

15. The method of claim 14, wherein said step of displaying further comprises the step of selecting a background selectable by said author representing various designs of the author's culture for inspiring creativity in the author which is superimposed on said platform.

16. The method of claim 15, wherein said step of displaying displays Kanji strokes which, when combined by said author, form Japanese Kanji characters as the pre-formed strokes.

17. The method of claim 15, wherein said step of displaying displays Chinese strokes which, when combined by said author, form Chinese characters as the pre-formed strokes.

18. The method apparatus of claim 15, wherein said step of displaying displays Korean strokes which, when combined by said author, form Korean characters as the pre-formed strokes.

19. The apparatus of claim 14, wherein said author in said step of selecting selects positions said pre-formed stroke selected at a nearest position to a grid.

20. The apparatus of claim 11, wherein said storing means stores stroke codes and positions of said strokes rather than pixel data, representing said ideogrammatic character, thereby reducing bandwidth and conserving memory.

21. The ideogrammatic character editing method of claim 20, further comprising the step of uploading or downloading said ideogrammatic character as created by said author over the internet.

22. An ideogrammatic character editor apparatus for creating an ideogrammatic character which is comprised of a series of strokes representing a word of a language for reproduction substantially as created by an author of said ideogrammatic character, comprising:
    platform means for displaying pre-formed strokes and for providing a platform on which said pre-formed strokes are positioned;
    selecting means for selecting and positioning by said author particular pre-formed strokes displayed by said platform means on said platform to thereby create said ideogrammatic character;
    encoding means for encoding each pre-formed stroke selected and positioned by said selecting means on said platform as a stroke code and a position on said platform such that the stroke codes and the positions represent the particular pre-formed strokes as displayed by said platform means and as positioned with respect to each other on said platform by said author by operation of said selecting means;

storing means for storing the stroke codes and the positions representing the ideogrammatic character as displayed by said platform means and as positioned with respect to each other on said platform by said author by operation of said selecting means such that a data size of the data representing the ideogrammatic character as stored in said storing means is significantly reduced; and processing means for storing said stroke code and said position for each pre-formed stroke encoded by said encoding means to said storing means such that said ideogrammatic character is reproducible from said storing means substantially as said particular pre-formed strokes as displayed by said platform means and as positioned with respect to each other by said author by operation of said selecting means; wherein said ideogrammatic character is reproducible from said storing means as substantially created by said author such that a matching system by which said ideogrammatic character formed by said author is matched to a database of ideogrammatic characters is not employed thereby reducing a time for encoding and storing said ideogrammatic character.

23. The apparatus of claim 22, wherein said author by operation of said selecting means positions said pre-formed strokes selected thereby at any relative position to other pre-formed characters strokes positioned on the platform; wherein said processing means stores for reproduction said stroke codes and positions substantially as said particular pre-formed strokes selected and positioned by said author.

24. The apparatus of claim 23, further comprising editing means for selecting and repositioning said pre-form stroke already positioned on said platform by said selecting means and for updating said stroke code and said position in said storing means.

25. The apparatus of claim 24, wherein said selecting means comprises a mouse for selecting by clicking said pre-formed stroke and dragging the clicked-on-stroke to a position on said platform.

26. The ideogrammatic character editor apparatus of claim 25, wherein said platform means further comprises a background selectable by said author representing various designs of the author's culture for inspiring creativity in the author which is superimposed on said platform.

27. The apparatus of claim 26, wherein said selecting means positions said pre-formed stroke selected by said author by operation of said selecting means at a nearest position of a grid.

28. The of claim 27, wherein said platform means displays Kanji strokes which, when combined by said author, form Japanese Kanji characters from the particular pre-formed strokes.

29. The apparatus of claim 27, wherein said platform means displays Chinese strokes which, when combined by said author, form Chinese characters from the particular pre-formed strokes.

30. The apparatus of claim 27, wherein said platform means displays Korean strokes which, when combined, by said author form Korean characters from the preformed strokes.

31. The apparatus of claim 22, wherein said storing means stores stroke codes and positions of said strokes rather than pixel data representing said ideogrammatic character, thereby reducing bandwidth and conserving memory.

32. The apparatus of claim 31, further comprising means for uploading or downloading said ideogrammatic character as created by said author over the internet.

33. The apparatus of claim 22, wherein said processing means stores said stroke codes and said positions for the pre-formed strokes encoded by said encoding means representing ideogrammatic characters which are created by the author including those which are not predetermined by a language.

34. The apparatus of claim 33, wherein a number of ideogrammatic characters created by the author and stored is unlimited.

35. The apparatus of claim 22, wherein said author creates ideogrammatic characters not predetermined by said language including signatures.

36. The apparatus claim 22, wherein said processing means forms in said storing means a stroke loc list comprising a readable portion of data representing the stroke codes and the positions representing the ideogrammatic character as created by said author.

37. The apparatus of claim 36, wherein said processing means forms said stroke loc list as a data string of numbers representing said ideogrammatic character as created by said author.

38. The apparatus of claim 36, wherein said processing means forms said stroke loc list to have a band width which is compatible for transmission over the internet.

39. The apparatus of claim 36, wherein said processing means forms said stroke loc list to include said stroke codes and positions corresponding to a plurality of ideogrammatic characters as substantially created by said author representing a plurality of words which are related in literal context.

40. The apparatus of claim 36, wherein said processing means stores said stroke codes and said positions corresponding to a plurality of ideogrammatic characters substantially as created by said author which form a document.

41. The apparatus of claim 40, wherein said document is a haiku having a specific arrangement of said plurality of ideogrammatic characters in accordance with haiku standards.

42. The apparatus of claim 22, wherein said selecting means allows said author to position said pre-formed strokes on said platform means to form a plurality of ideogrammatic characters aligned in any alignment on said platform means including a vertical arrangement of said ideogrammatic characters in accordance with an Asian-style of writing.

43. The apparatus of claim 22, wherein said platform means is a single platform comprising a single continuous area on a computer monitor where said pre-formed strokes are selected and positioned by said author for display.

44. The apparatus of claim 22, wherein said platform means is formed with a dojo pattern bounded by four sides with said pre-formed strokes displayed in a shoji arrangement along each side of said platform means.

45. The apparatus of claim 44, wherein said pre-formed strokes arranged in said shoji are arranged according to a type of stroke.

46. The apparatus of claim 45, wherein the type of stroke is characterized by a direction of movement when said author creates a stroke in written language.

47. The apparatus of claim 22, wherein said platform means is formed as an Asian-scroll being substantially rectangular and elongated in a vertical direction.

48. The apparatus of claim 22, wherein said platform means is in the shape of a circular platform.

49. The apparatus of claim 22, wherein said encoding means encodes said pre-formed strokes as said stroke codes and positions such that a data size of the stroke codes and positions are substantially small such that a computer processor which reproduces for display said ideogrammatic character does not require resetting.

50. The apparatus of claim 22, wherein said encoding means encodes said positions representing the precise position of said pre-formed strokes on said platform means as positioned by said author.

51. The apparatus of claim 22, wherein said processing means reproduces said ideogrammatic character stored in said storing means for communication to a reader at a remote location.

52. An ideogrammatic character editor apparatus for creating an ideogrammatic character which is comprised of a series of strokes representing a word of a language for reproduction substantially as created by an author of said ideogrammatic character, comprising:

a platform that displays pre-formed strokes and provides an area on which said pre-formed strokes are positioned;

a selector that selects and positions said pre-formed strokes on by said author platform to thereby create said ideogrammatic character;

an encoder that encodes each pre-formed stroke selected and positioned by said selector on said platform as a stroke code and a position on said platform such that the stroke codes and the positions represent the particular pre-formed strokes as displayed by said platform and as positioned with respect to each other on said platform by said author by operation of said selector; and a memory for storing the stroke and the positions representing the ideogrammatic character as displayed by said platform and as positioned with respect to each other on said platform by said author by operation of said selector such that a data size of the data representing the ideogrammatic character as stored in said memory is significantly reduced; and a processor for storing said stroke code and said position for each pre-formed stroke encoded by said encoding means in a stroke loc list to said memory such that said ideogrammatic character is reproducible from said memory substantially as said particular pre-formed strokes as displayed by said platform and as positioned with respect to each other by said author by operation of said selector; wherein said ideogrammatic character is reproducible from said memory as substantially created by said author such that a matching system by which said ideogrammatic character formed by said author is matched to a database of ideogrammatic characters is not employed thereby reducing a time for encoding and storing said ideogrammatic character.

53. The apparatus of claim 52, wherein said author by operation of said selector positions said pre-formed strokes selected thereby at any relative position to other pre-formed strokes positioned on the platform; wherein said processor stores for reproduction said stroke codes and positions substantially as said particular pre-formed strokes selected and positioned by said author.

54. The apparatus of claim 53, further comprising an editor that selects and repositions said pre-formed stroke already positioned on said platform by said selector and for updating said stroke code and said position in said memory.

55. The apparatus of claim 54, wherein said selector comprises a mouse for selecting by clicking said pre-formed stroke and dragging the clicked on stroke to a position on said platform.

56. The apparatus of claim 55, wherein said platform further comprises a background selectable by said author representing various designs of the author's culture for inspiring creativity in the author which is superimposed on said platform.

57. The apparatus of claim 56, wherein said selector positions said pre-formed stroke selected by said author by operation of said selector at a nearest position to a grid.

58. The apparatus of claim 56, wherein said platform displays Kanji strokes which, when combined by said author, form Japanese Kanji characters from the particular pre-formed strokes.

59. The apparatus of claim 56, wherein said platform displays Chinese strokes which, when combined by said author, form Chinese characters from the particular pre-formed strokes.

60. The apparatus of claim 56, wherein said platform displays Korean strokes which, when combined by said author, form Korean characters from the particular pre-formed strokes.

61. The apparatus of claim 52, wherein said storing means stores stroke codes and positions of said strokes rather than pixel data representing said ideogrammatic character, thereby reducing bandwidth and conserving memory.

62. The apparatus of claim 61, further comprising means for uploading or downloading said ideogrammatic character as created by said author over the internet.

\* \* \* \* \*